N. E. LARSON (NOW BY JUDICIAL CHANGE OF NAME N. E. GOODACTIVE).
AUTOMATIC BELT SHIFTER.
APPLICATION FILED AUG. 31, 1917.
1,319,014.
Patented Oct. 14, 1919.
8 SHEETS—SHEET 1.
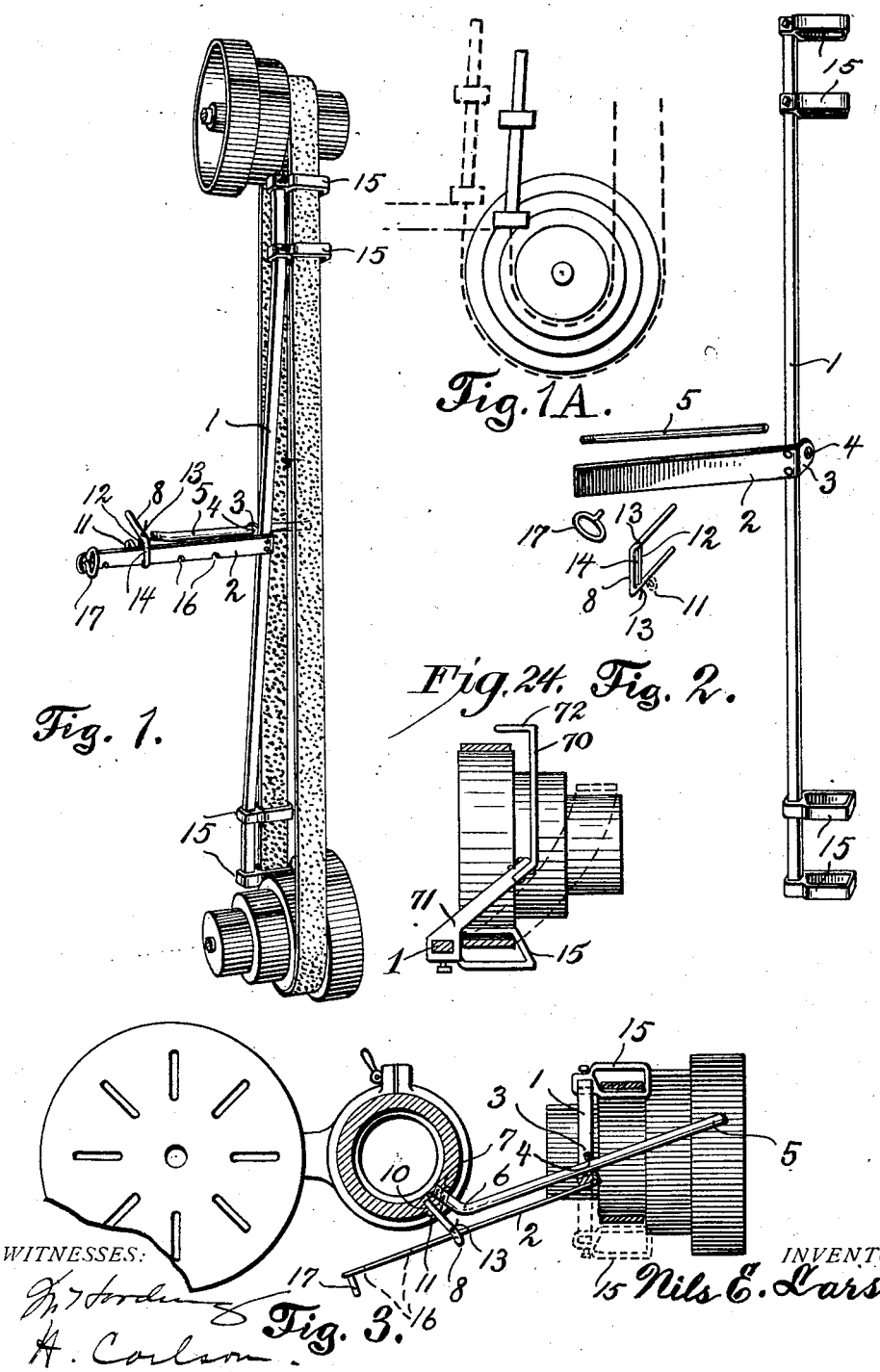

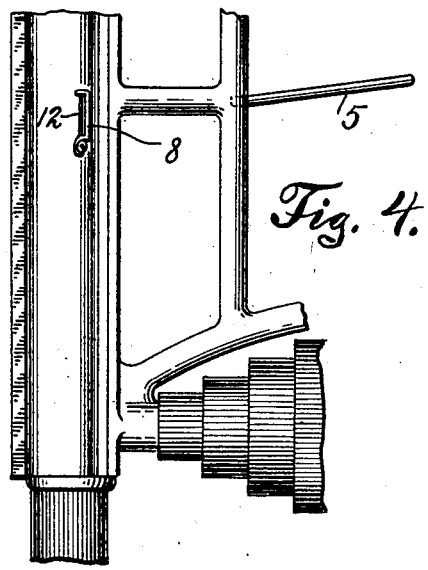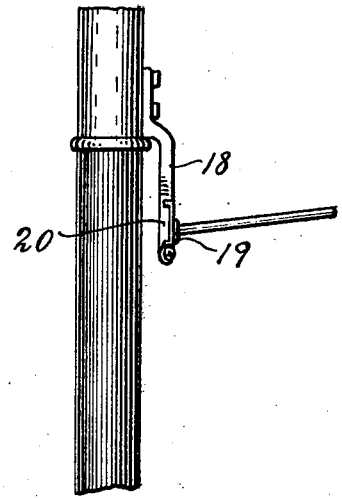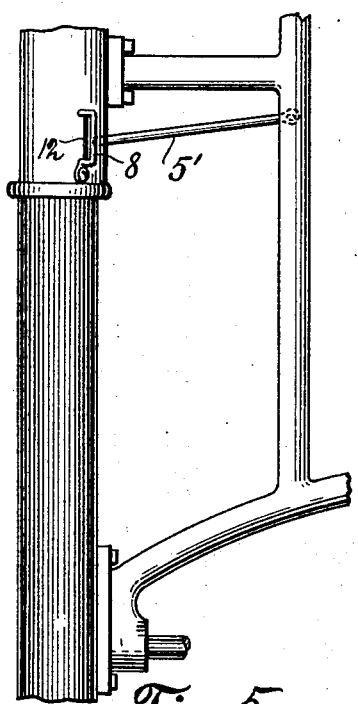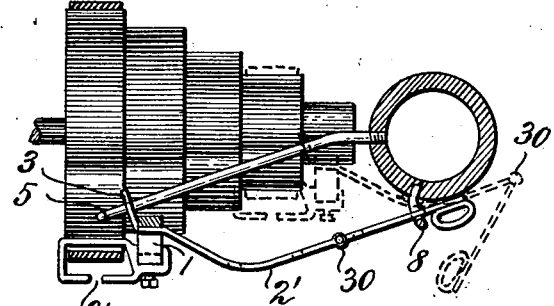

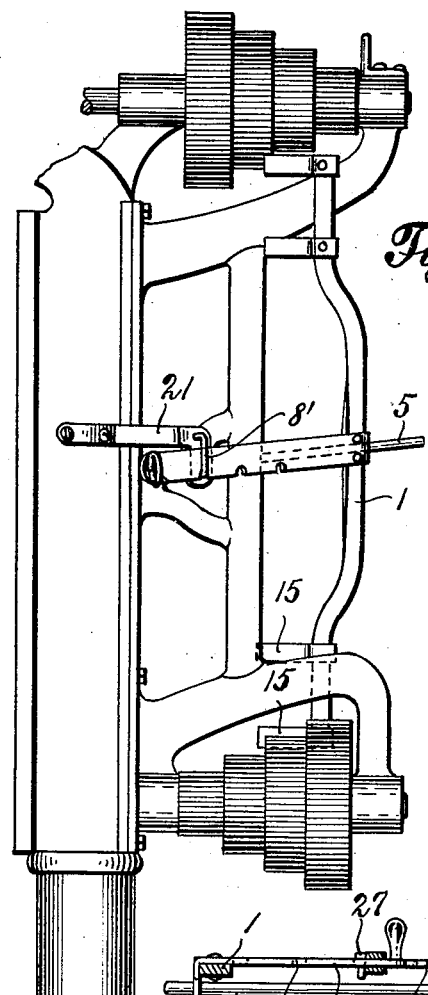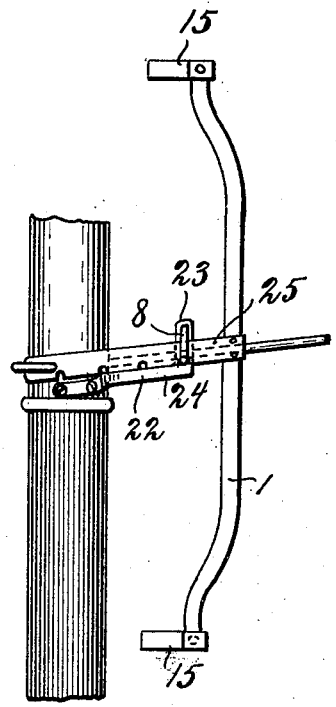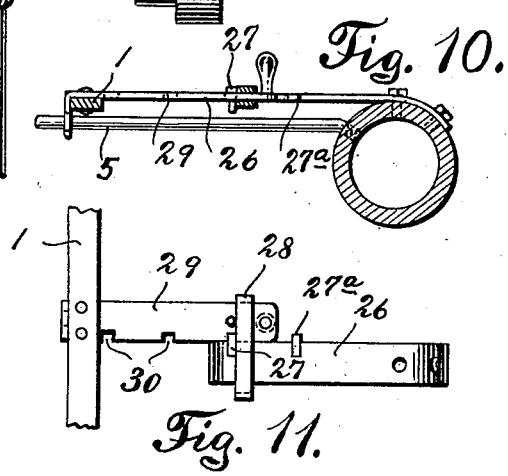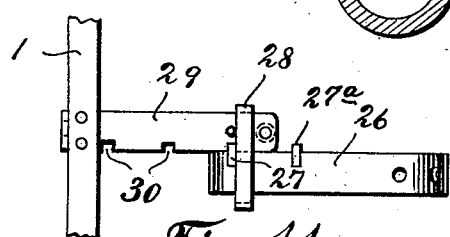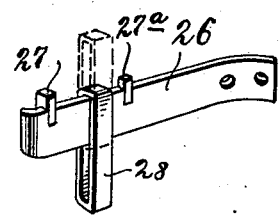

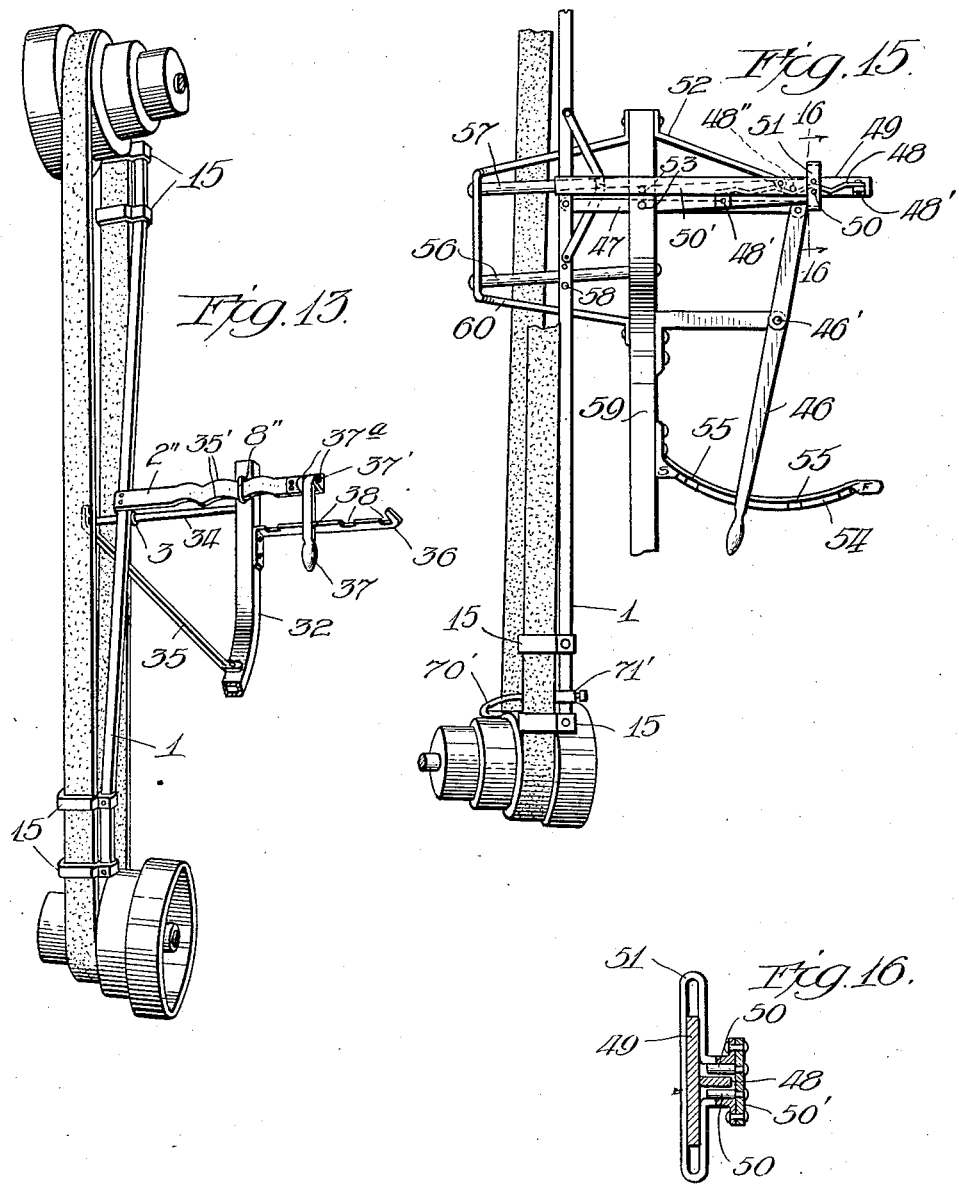

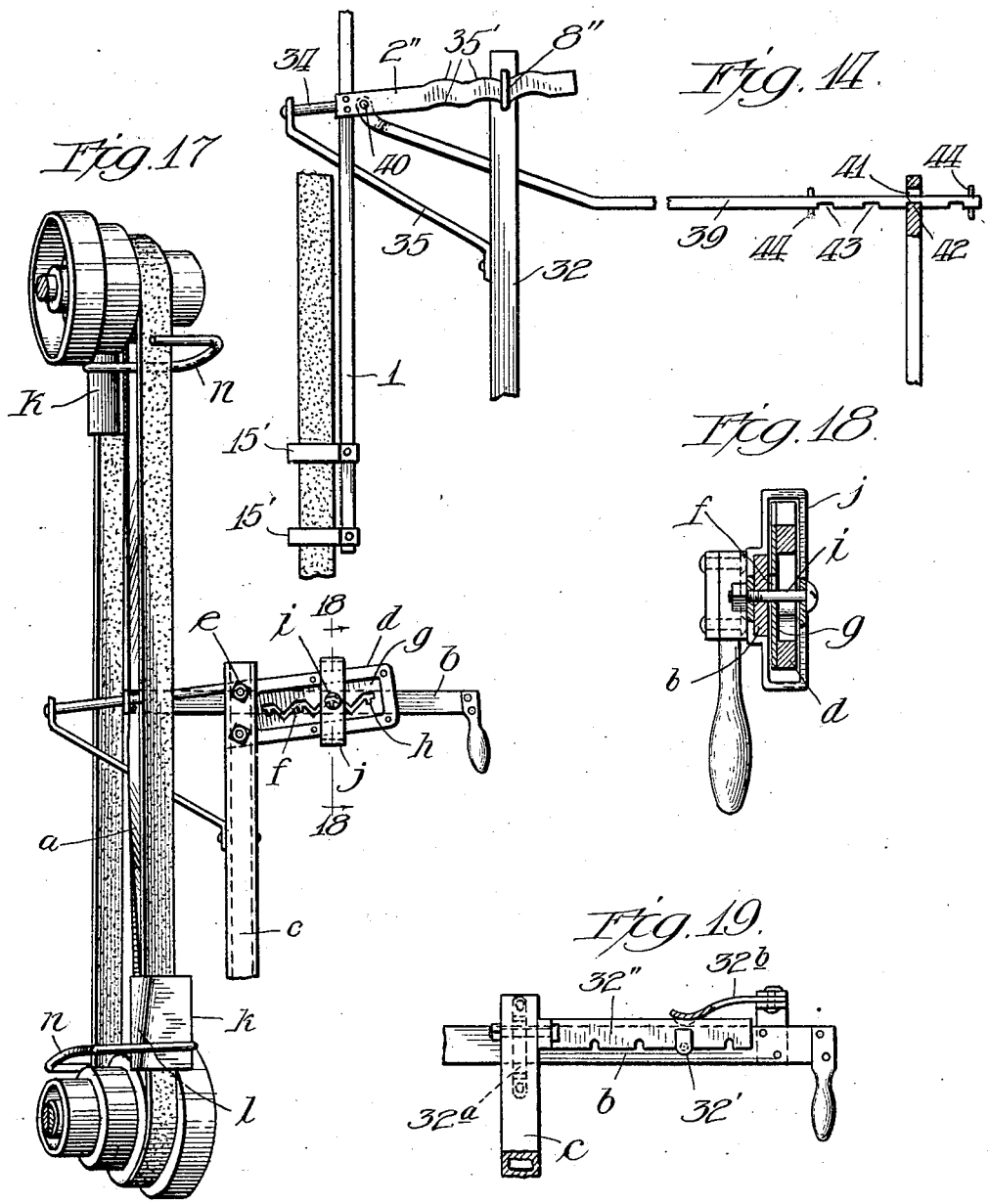

N. E. LARSON (NOW BY JUDICIAL CHANGE OF NAME N. E. GOODACTIVE).
AUTOMATIC BELT SHIFTER.
APPLICATION FILED AUG. 31, 1917.

1,319,014.

Patented Oct. 14, 1919.
8 SHEETS—SHEET 6.

WITNESSES:

INVENTOR,
Nils E. Larson

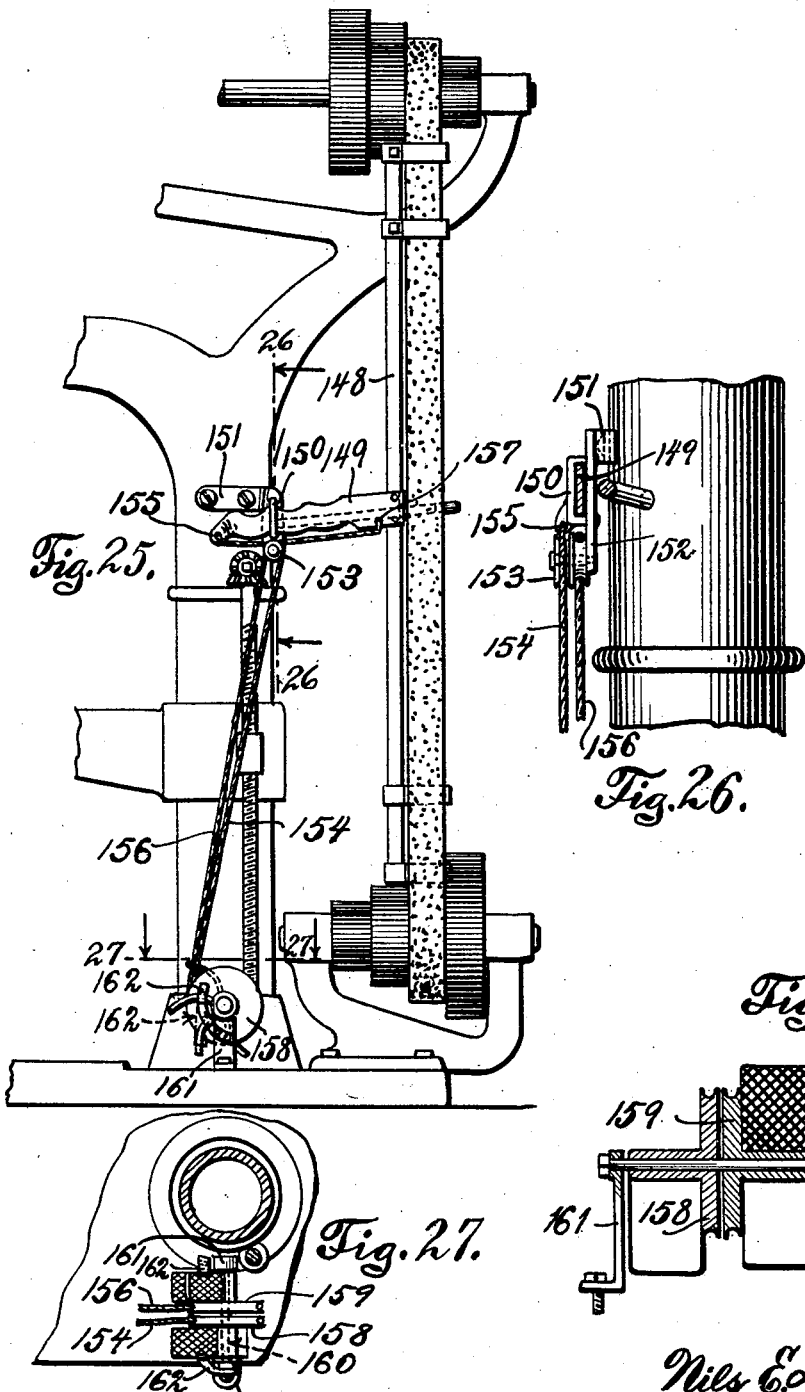

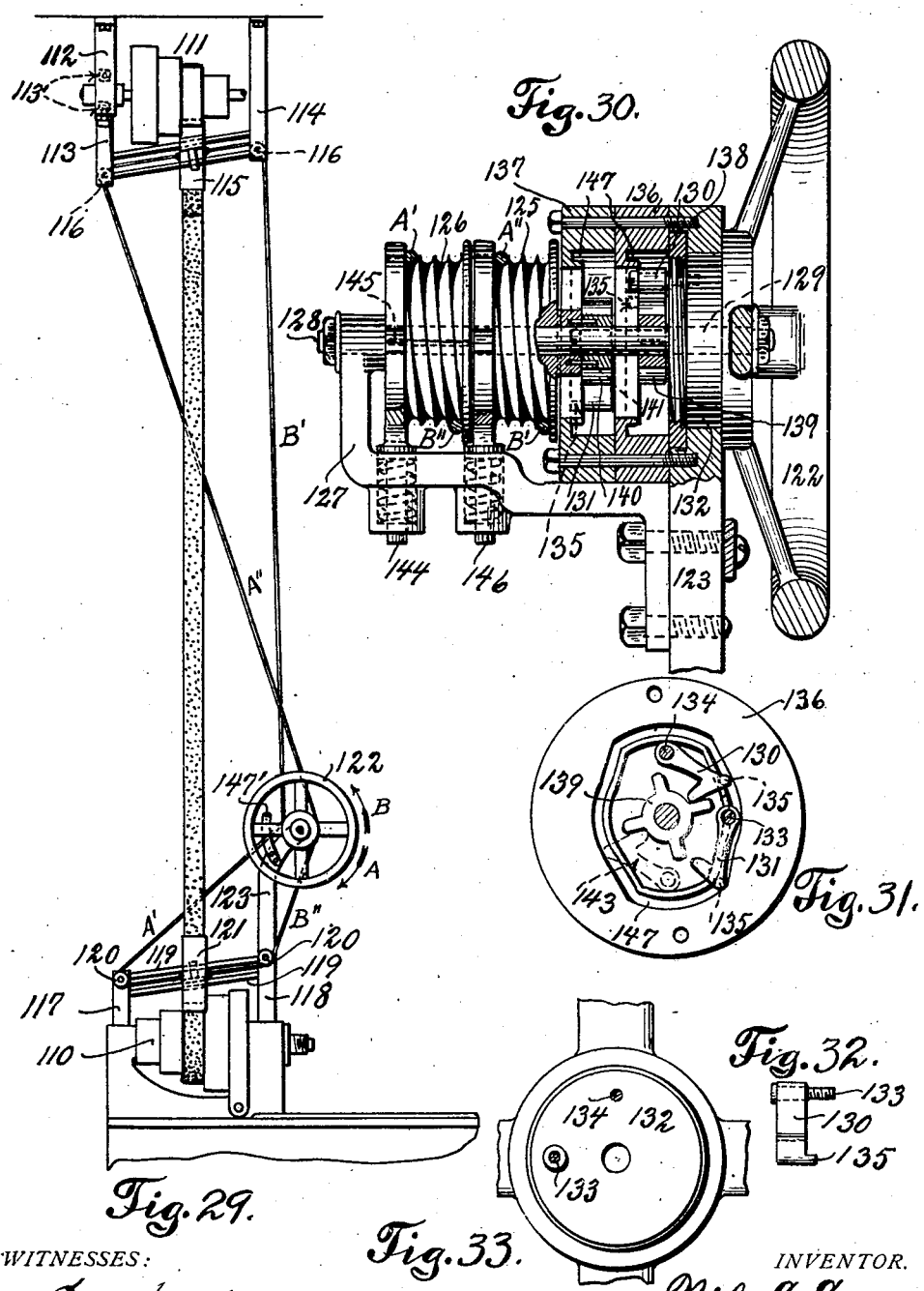
N. E. LARSON (NOW BY JUDICIAL CHANGE OF NAME N. E. GOODACTIVE).
AUTOMATIC BELT SHIFTER.
APPLICATION FILED AUG. 31, 1917.
1,319,014.
Patented Oct. 14, 1919.
8 SHEETS—SHEET 8.

UNITED STATES PATENT OFFICE.

NILS E. LARSON, OF CHICAGO, ILLINOIS, (NOW BY JUDICIAL CHANGE OF NAME NILS E. GOODACTIVE).

AUTOMATIC BELT-SHIFTER.

1,319,014. Specification of Letters Patent. Patented Oct. 14, 1919.

Continuation of application Serial No. 92,304, filed April 19, 1916. This application filed August 31, 1917. Serial No. 189,109.

*To all whom it may concern:*

Be it known that I, NILS E. LARSON, (now by judicial change GOODACTIVE,) a citizen of the United States, residing at Chicago, in the county of Cook and State of Illinois, have invented new and useful Improvements in Automatic Belt-Shifters, of which the following is a specification.

This invention relates to improvements in belt shifters, and more particularly to belt shifters of the type adapted for use in connection with the power transmitting belts of cone-pulley driven machines, the present application being filed as a continuation of and substitute for my prior application filed April 19, 1916, Serial No. 92,304.

One object of the invention is to provide a belt shifter of the type described, which shall be so constructed that the operator of a machine, to which the shifter has been applied, may shift the belt thereof over the cones of pulleys quickly and easily, and without the dangers and inconveniences heretofore encountered.

Another object is to provide a belt shifter which may be operated by means of a single manually controlled operating member, and, further, the provision of a belt shifter which may be locked in its various positions of adjustment.

A further object of the invention resides in the provision of improved means whereby the belt-embracing members of the shifter may be maintained at substantially the same distance from the respective steps on the pulleys for each position of the belt.

Other objects and advantages will be apparent from the following description, taken in connection with the accompanying drawings wherein a number of embodiments of the invention are illustrated.

Figure 1 is a perspective view showing one embodiment of the invention in operative position relative to the belt and cone pulleys of a drill-press;

Fig. 1A is a diagrammatic view, illustrating the method of determining the pitch of the supporting or pivot rod;

Fig. 2 is a perspective view showing the parts of the belt shifter of Fig. 1 disassembled;

Fig. 3 is a horizontal sectional view showing a portion of the drill-press in top plan;

Figs. 4, 5 and 6, are side elevations, portions being broken away, of drill-press frames of different designs, showing different methods of mounting the pivot rod thereon;

Fig. 7 is a sectional plan view illustrating a slightly modified form of shifter operably mounted on a drill-press;

Fig. 8 is a side elevation showing a slightly modified form of shifter adapted for use on a drill-press of special design;

Figs. 9, 10, 11 and 12, are detailed views of modified forms of operating arms, together with their retaining straps;

Fig. 13 is a perspective view of another form of belt shifter;

Fig. 14 is a perspective view of a shifter similar to that shown in Fig. 13, showing an elongated operating arm which may be manipulated from any point in front of the machine to which the shifter has been applied;

Fig. 15 is a perspective view of a shifter especially adapted for use on machines having extra long belts;

Fig. 16 is a sectional view taken on the line 16—16 of Fig. 15;

Fig. 17 is a perspective view of another modified form of belt shifter;

Fig. 18 is a sectional view taken on the line 18—18 of Fig. 17;

Fig. 19 is a side elevation, parts being broken away, illustrating a modified arrangement of the operating arm and associated parts;

Fig. 24 is a view similar to Fig. 23, showing still another form of follower;

Fig. 25 is a side elevation of a foot operated belt shifter, the same being shown in operative position on a drill press;

Fig. 26 is a sectional view taken on the line 26—26 of Fig. 25;

Fig. 27 is a sectional view taken on the line 27—27 of Fig. 25;

Fig. 28 is a vertical sectional view taken through the foot-operated device;

Fig. 29 is a side elevation of another form of shifter and operating mechanism therefor;

Fig. 30 is a detailed view, partly in section, of the operating mechanism for the shifter shown in Fig. 29; and Figs. 31, 32 and 33 are detailed views of portions of the operating mechanism of the shifter shown in Fig. 29.

Figure 21:
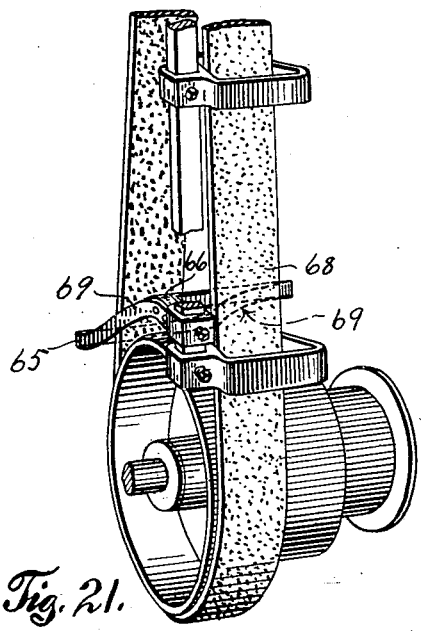
Fig. 21 is a perspective view, showing one of my improved shifters provided with means in the form of followers for guiding the belt from one step of the cone to another, thus overcoming the tendency of the belt to drop, as shown in Fig. 20.

Referring more in detail to the drawings, the improved shifter is shown comprising a shifting rod 1, and an operating arm 2 angularly disposed relatively thereto and rigidly secured thereto in any desired manner. The operating arm 1 is bent at one end at substantially right angles to provide a lug 3, in which is provided an aperture 4 which is adapted to receive the supporting or pivot rod 5, said pivot rod being designed to be screwed into the rear of the drill-press column or secured thereto in any other suitable manner. The rod 5 is bent as at 6, Fig. 3, so that it extends inwardly substantially parallel with the belt-on side of each of the cones. The rod 5 is also inclined slightly upwardly, as shown in the various figures, the upward pitch of said rod being determined by the pitch of the cones and being substantially equal to the distance between the lower and upper steps thereof. This upward and inward inclination imparted to the supporting or pivot rod 5 is a very important feature of the present improvements in that it enables the belt embracing members carried by the shifting rod 1, and to be hereinafter described, to be maintained at substantially the same distance from the respective steps on the pulleys for each position of the belt. As an additional means of securing the rod 5 firmly in place, the pin 7 may be employed as shown.

At 8 is illustrated a retaining strap for the operating arm 2 of the shifter, said strap being adapted for attachment to the drill-press column, the upper leg thereof being driven into the hole 10 in said column, while the lower leg may be coiled, as shown, to form an eye adapted to receive a suitable fastener. A suitable pin 12 is riveted or otherwise secured in place in a suitable aperture 13 provided in the strap 8, said pin 12 being spaced a sufficient distance from the outer part 14 of the strap to form a narrow slot. The operating arm 2 passes through this slot freely and so maintains the shifter against tilting and lateral displacement.

The belt embracing members, above referred to, are in the form of loops or guides 15 adjustably secured in position at opposite ends of the shifting rod 1 by means of set screws, it being preferred to provide a pair of these loops or guides at each end of the rod 1, and to space them apart sufficiently to insure an effective guiding of the belt and also to prevent accidental displacement thereof. It is also preferred to mount the outermost loops in as close proximity to their respective cones as possible, the upwardly and inwardly inclined mounting of the supporting rod 5 serving to maintain said outermost loops in such position and at the same distance from the respective pulley steps regardless of which step the belt is operating on.

From the above, it will be noted that the shifting rod 1 is slidably and pivotally mounted on the supporting rod 5, said shifting rod being adapted to be manipulated by means of a suitable hand-grip 17 carried at the outer end of the operating arm 2. The lower edge of the operating arm 2 is provided with a series of notches 16 designed to engage the strap 8, whereby said arm may be locked in any of its positions of adjustment, there being one notch for each of such positions.

In the operation of the shifter, the operating arm 2, by means of the hand-grip 17, is first lifted slightly so as to disengage the strap 8 from one of the locking notches. This causes the shifter to oscillate on the rod 5 as a pivot, such oscillatory motion being transmitted to the belt embracing members 15 by means of the shifting rod 1, as a result of which the belt is forced off of the pair of steps on which it was operating and onto the smaller pair of steps adjacent thereto. In this manner, the belt is made slack and may then be readily and quickly shifted to other operative positions on the pulleys by merely moving the operating arm 2 longitudinally of the pivot rod 5 in the desired direction, either to the right or to the left. This operation causes the belt to be moved into operative position on the pair of pulley steps which will give the desired cutting speed, the shifter being locked in such position by releasing the arm 2 and allowing the notch 16 thereof, which corresponds to such position, to engage the strap 8.

It will be noted from the foregoing that an exceedingly simple, effective, and easily and quickly operable shifter is provided. Furthermore, as will appear from the following, a shifter has been provided which is readily adaptable for use in connection with practically all machines which are operated by means of a belt and cone pulley change speed mechanism. In each of the embodiments illustrated in the other figures of the drawings, the feature of maintaining the belt embracing members in the same position relatively to the pulley steps for each position of the belt is carried out, said figures merely disclosing further adaptations of the invention, different forms of actuating mechanisms, and, in some instances modified forms of supports for guiding the belt shifting loops are shown. In each of the embodiments herein illustrated, however, the broad characterizing principles of operation of the invention, as defined above, are present.

In Figs. 4, 5 and 6, several methods of mounting the rod 5 on machines having specially designed frames are illustrated. In Figs. 4 and 5, the retaining strap 8 for the operating arm 2 is shown mounted directly on the column of the machine, the supporting rod 5 in Fig. 4 being shown secured to one of the upright frame members and projecting therefrom outwardly, whereas in Fig. 5, the rod 5 is shown mounted between the column of the machine, and the upright member of the frame. In Fig. 6 one way of mounting the rod 5 on a machine having an unusually tall column is illustrated. In this figure, the rod 5 is shown screw-threadedly engaging a boss 19 formed on the lower end of a bracket 18 which is secured to the column of the machine above the center thereof, and which depends in such wise as to position the rod 5 substantially midway between the two cone pulleys. In this form of the invention, the strap 8 is also carried by the bracket 18, the same being secured to a flattened portion 20 on the bracket at the lower end thereof.

In Fig. 7 is illustrated a shifter similar to that illustrated in Fig. 1 of the drawings, the same being provided with a modified form of operating arm 2′, such arm being especially designed for use in connection with belt shifters which are operated from the column of the machine outwardly away therefrom instead of toward the machine, as shown more clearly in Fig. 3. With this in view, therefore, the operating arm 2′ is shown bent slightly outwardly in order to clear the column as the shifter is manipulated, and in view of the direction in which said arm projects the same is hinged as at 30 intermediate its ends, so that the shifter may be conveniently operated to shift the belt to extreme positions on the pulleys, as shown in dotted lines. In this form of shifter, a slightly modified form of belt loop is shown, the same being provided with a slotted opening 31 in the rear thereof in order to permit of the belt being passed into and out of position without necessitating the belt being cut in order to install the shifter on the machine.

In Fig. 8 a belt shifter designed primarily for use on machines having specially designed frames, as for instance, machines similar to that shown in Fig. 4, is illustrated. In this embodiment, however, the retaining strap 8′ for the operating arm 2 of the shifter is carried at the outer end of a bracket 21 which may be secured in any suitable manner to the column of the machine. As described in connection with Fig. 4, the pivot rod 5 may, if desired, be secured to the upright member of the frame of the machine in such wise that said rod projects outwardly therefrom. When this mounting is found desirable, the opposite ends of the shifter rod are offset slightly inwardly, so that the belt embracing members 15 carried thereby will project inwardly a sufficient distance to shift the belt onto any pair of the cone pulley steps. Otherwise, in view of the mounting of the rod 5, the belt embracing members would not project inwardly a sufficient distance to shift the belt onto the inner steps of the pulleys. In Fig. 9, a form of the invention is illustrated which is substantially similar to that disclosed in Fig. 8, the only difference residing in the provision of a bracket 22 having its outer end upturned as at 23 instead of being turned downwardly, as shown in Fig. 8. The strap 8 is mounted on one face of the upturned portion 23, which portion is slightly offset laterally from the shank 24 of the bracket, so as to permit of the operating arm resting on said shank 24. This construction imparts stability to the shifter when the same is in the position shown, namely, with the innermost notch in engagement with the strap 8, in which position the portion 25 between the shifter pivot and the strap 8 is not sufficient to balance the outer end of the operating arm.

In Figs. 10, 11 and 12 still further modifications of operating arms are illustrated, the object in their construction being to provide a comparatively short operating arm and one which coöperates with the column supporting bracket in providing the desired adjustments. With this in view, a bracket 26 is provided which is adapted for attachment to the column of the machine, said bracket being provided with a plurality of upstanding lugs 27 and 27ª designed for engagement within the notches 30 provided on the lower edge of the operating arm 29. The bracket 26 is anchored to the column, and the operating arm 29 is connected to the shifting rod 1, and is designed to be moved relatively to the bracket 26, so that the lugs 27 and 27ª may engage within the notches 30 of the operating arm to thereby lock the shifter in its predetermined adjusted position. To maintain the arm 29 and bracket 26 in operative engagement, there may be provided a suitable strap 28. In this manner a comparatively short operating arm is provided, the bracket 26 being utilized to obtain the desired distance between the column of the machine and the shifting rod 1.

In Fig. 13 is illustrated a shifter especially adapted for use in connection with lathes and certain types of milling machines and shapers, which machines are not usually provided with columns or other parts to which the shifter may be operably attached. When machines of this type are encountered, therefore, it becomes necessary to provide some suitable support for the shifting mechanism, and with this in view a suitable upright 32 is provided, the lower end of which may be secured in any suitable manner to the bed of the machine. At the upper end of this upright 32, the supporting or pivot rod 34 is attached, the outer end thereof being supported by a suitable bracket 35. To the upper end of the upright 32 is also secured the retaining strap 8″ for the operating arm 2″. The shifting rod 1 is attached to the operating arm 2″, and is provided with the belt embracing members 15, all in substantially the same manner as previously described in connection with Fig. 1, the operating arm 2″ serving to support the shifting rod 1, together with the belt embracing members 15 on the pivot rod 34 by means of the apertured lug 3 of said arm 2″. Secured to one edge of the upright 32 and projecting outwardly therefrom a suitable distance is shown a locking bar 36 notched as at 38, said notches being designed to receive the operating handle 37 of the arm 2″, in order to maintain the shifter in whatever position desired. In order to impart the desired oscillatory motion to the rod 1 when it is desired to shift the belt, the operating arm 2″ is provided with waved edges, as shown more clearly at 35′. The handle 37 of the operating arm 2″ is preferably pivotally attached to the outer end of said arm by means of a suitable bolt 37′ journaled in the upstanding lugs 37ª. When it is desired to operate the shifter, it is merely necessary to swing the handle 37 outwardly on its pivot out of engagement with the locking bar 36, and to then move the operating arm 2″ by means of said handle longitudinally of the pivot rod 34 in the direction which will move the belt onto the desired pair of pulley steps. During this longitudinal movement, it will be noted that the desired initial oscillatory motion, which is essential in forcing the belt off of the pair of steps on which it was operating, is imparted to the shifting rod 1 by the sliding of the waved edges 35′ over the lower leg of the retaining strap 8″. In this manner, the belt may be very easily and quickly shifted, the operation being entirely automatic.

In Fig. 14 a shifter of the type shown in Fig. 13 is shown, the operating handle 37 being omitted and the operating arm 2″ being provided with an elongated operating rod 39, which rod it is preferred to construct of sufficient length to extend the full length of the lathe or other machine to which the shifter is applied, so that the shifter may be operated by means of the rod 39 from any point in front of the machine. The far end of the rod 39 preferably extends through a suitable support 42, said rod being provided with notches 43 designed to engage the support 42 to thereby maintain the rod 39 and the shifter in any of its adjusted positions. If desired, suitable stops 44 may be provided on the rod 39 adjacent the notched portion thereof in order to limit the throw of the rod. This form of operating mechanism may be used in connection with shifters of any of the types herein illustrated and described, if desired, such mechanism being found particularly desirable for use in connection with lathes by reason of the fact that the operator is enabled to shift the belt without walking to the end of the machine to do so.

In Fig. 15 is illustrated a shifter which is designed primarily for use in connection with machines of such design that the operating arm of the shifter is out of reach when the device is in operative position. For instance, in certain types of milling machines and lathes it has been found that when the shifter is mounted with the pivot rod disposed substantially midway between the two cones that the operating arm of the shifter is disposed at such a height that it is either entirely out of reach of the operator or cannot be reached conveniently. When such machines are encountered therefore some means located within easy reach of the operator, whereby he is enabled to manipulate the shifter, is essential. As above stated, one form of device which may be so operated is disclosed in Fig. 15, wherein the pivot rod 57 is supported adjacent the upper end of the upright supporting standard 59 by means of a suitable bracket 60. A substantially vertically disposed operating lever is illustrated at 46, said lever being pivoted intermediate its ends at 46′ to a supporting member carried by the upright 59, the upper end of said operating lever 46 being pivotally attached to a transverse member 47 which connects said lever 46 to the shifting rod 1. Secured to the upright 59 and projecting outwardly therefrom adjacent the lower end of the operating lever 46 is a suitable locking quadrant 54 notched as at 55 in order that the operating lever 46 may be maintained in any of its positions of adjustment. The operating arm of the shifter shown in this embodiment of the invention is illustrated at 50′, and is connected to the shifting rod 1, and pivotally and slidably mounted on the pivot 57 in substantially the same manner as previously described in connection with the other embodiments of the invention. In view of the fact that shifters of the type shown in Fig. 15 are designed primarily for use on machines. the cone pulleys of which are unusually far apart, it has been found desirable to provide a guide rod such as shown at 56 in order to better maintain the shifting rod 1 against lateral and other displacements. As will be noted from the drawings, the rod 1 is attached to the guide rod 56 by means of a suitable staple 58. The guide rod 56 is also mounted between the bracket 60 and the upright 59 and is substantially parallel with the pivot rod 57.

In order to impart to the shifting rod 1 the desired oscillatory motion which, as above stated, is desirable in shifting the belt, a suitable cam plate 48 is provided, said cam plate being mounted on the cam bracket 49 which is secured to the upright 59, as shown at 53, and which is further supported rigidly in position by means of the bracket 52. The cam bracket 49 is provided with suitable supports 48' to which the opposite ends of the cam plate are secured. On the inner end of the operating lever 50' is rigidly secured a strap 51 which slidably embraces the cam bracket 49, as shown more clearly in Fig. 16. A plurality of pilots 50 are mounted on the operating arm 50' and extend inwardly therefrom between said cam plate 48 and the adjacent sides of the embracing strap 51. These pilots are designed to engage the opposite surfaces of the cam plate 48 and to thus oscillate the shifting rod 1 about the pivot rod 57 as the shifter is moved longitudinally of said rod 57 by means of the operating lever 46.

In this form of the invention there is also illustrated what I term a follower 70' in the form of a wire hook which is mounted on the shifting rod 1 as at 71'. The function of this follower is to guide the rear lap of the belt when the same is being shifted, in order to prevent it from dropping down on the lower step of the cone, as shown more clearly in Fig. 20, thus preventing the belt from being properly and quickly shifted. This dropping of the belt in such wise as to impair the shifting of the same is encountered particularly in connection with steep cones. These followers have been found to be very effective in maintaining the belt in proper position and in enabling the operator to quickly shift the same by means of the mechanism already described. These followers may be of various designs, as will be more apparent from the following.

In Fig. 17 is illustrated a still further form of the invention, wherein a modified form of the operating mechanism disclosed in connection with the embodiment shown in Fig. 15 is illustrated. In this figure, the pivot rod is mounted on the upper end of the upright $c$ and is further supported rigidly in position by means of a suitable bracket which engages the outer end thereof and which is also secured to the upright. Slidably and pivotally mounted on the pivot rod in the usual manner is shown the operating arm $b$ to which is secured in the usual manner the shifting rod $a$, at opposite ends of which are mounted the belt embracing members $k$ shown in this form of the invention as elongated tubular members. Followers $n$ are also shown in this illustration and are preferably rigidly secured to the tubular belt embracing members $k$. It has been found desirable in the use of a belt embracing member of the type shown in this embodiment, to incline the side thereof which lies adjacent the small end of the cone pulley, so as to provide, in effect, a cam surface or guide for the belt when the same is shifted from one step to another. This inclined portion of the belt embracing member is illustrated more clearly at L. It has been found in the use of belt embracing members of this type that the cam surface thereof serves to guide the belt, so that it may readily and quickly pass onto the higher cone step during the shifting operation. Without this construction, the belt may assume a position such as indicated in dotted lines at $m$ in Fig. 23, in which position the edge of the cone step presses against the belt and prevents the same from riding up on said step.

The operating arm $b$, shown in Fig. 17, is provided with a suitable strap $j$, which embraces said arm $b$ and which also embraces the cam bracket $d$, which is secured to the upright $c$ by means of suitable bolts $e$, said cam bracket $d$ extending outwardly from the upright $c$, and being positioned adjacent and in close proximity to the operating arm $b$, the strap $j$ serving to hold the arm $b$ and the cam bracket $d$ against separation. Secured to the cam bracket $d$ in any suitable manner is shown a cam plate $g$ having formed therein a cam groove $f$ of waved design, there being provided at suitable intervals along the lower side of the groove $f$ suitable locking notches $h$. Secured to the strap $j$ and extending through the operating arm $b$ and the cam groove $f$ is shown a suitable pilot $i$. This pilot is fast with the arm $b$ and the strap $j$, which latter slidably embraces the cam bracket $d$, and thus permits of the operating arm $b$ being moved longitudinally relatively to the pivot rod to thus shift the belt, the oscillatory motion being imparted to the shifting rod $a$ by means of the coöperation between the pilot $i$ and the cam groove $f$ when the shifter is operated. The locking notches $h$ are designed to be engaged by the pilot $i$ in the various positions of adjustment of the shifter, whereby the same may be locked in any one of such positions.

In Fig. 19, a slightly modified arrangement of the operating arm and associated parts is illustrated. In this embodiment, the operating arm is slidably mounted in the strap $32^a$ carried at the upper end of the supporting upright and is provided intermediate said supporting upright and its outer end with a suitable locking pin $32'$. A locking bar $32''$ is also carried at the upper end of the supporting upright and projects outwardly therefrom adjacent one surface of the operating arm $b$, said bar being provided with a plurality of notches designed for engagement with the locking pin $32'$ carried by the operating arm. In operating the shifter by means of the construction illustrated in this figure, the operating arm $b$ is lowered instead of being raised, as in the preferred embodiment of the invention, in order to disengage the locking pin $32'$ from the engaging notch, thus permitting said arm $b$ to be moved longitudinally to shift the belt of the machine. The arm $b$ is normally maintained with its locking pin $32'$ in engagement with one of the notches of the bar $32''$ by means of the resilient member $32^b$ which is carried by a suitable supporting element mounted on the arm $b$ and which extends into contact with the upper edge of the locking bar $32''$, thus serving to urge said bar downwardly into engagement with the locking pin of the arm $b$ at all times.

Figure 20:
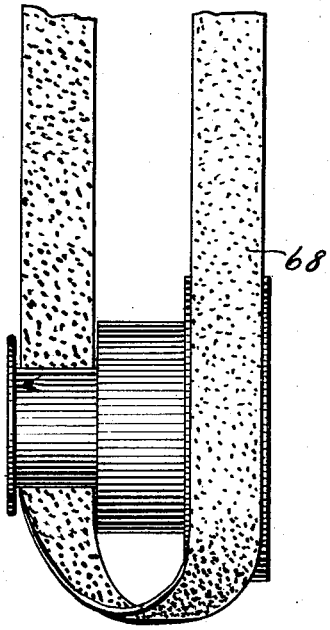
Fig. 20 illustrates a steep cone showing the tendency of the rear portion of the belt to drop down on the smallest step of the cone, the slack thus produced in the belt preventing it from rolling onto the larger step of the cone.
Figure 22:
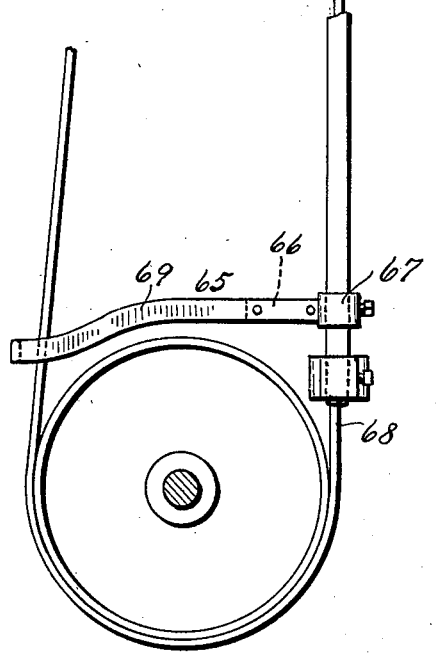
Fig. 22 is a side elevation of the shifter shown in Fig. 21.
Figure 23:
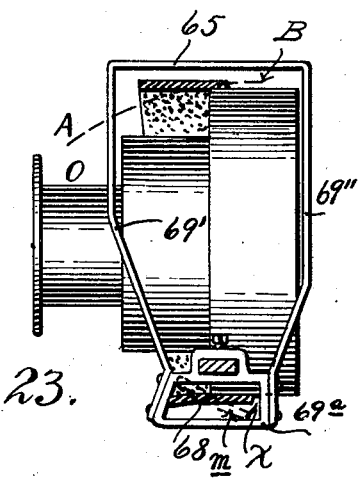
Fig. 23 is a top plan view showing a slightly modified form of follower.

In Figs. 21, 22 and 23, I have illustrated further forms of followers for use in connection with my improved shifter. The follower shown in Figs. 21 and 22 is in the form of a loop 65, said loop being preferably formed from a strip of metal bent to the desired shape, the inner ends of said strip being adapted for attachment in any suitable manner to the shank 66 of an adjustable supporting hub 67, which is designed to embrace the shifting rod at a point slightly above the lower belt embracing member. The hub member, together with the follower, may be adjusted by means of a suitable set screw, as shown. It is also preferred to bend the loop slightly as at 69 in order that the portion of the follower which lies adjacent the belt will also lie in close proximity to the cone pulley, as shown clearly in Figs. 21 and 22. In Fig. 23 a follower 65 is shown attached directly to a belt embracing member $69^a$ of slightly different design, said belt embracing member being provided with the diagonal or cam surface which is designed to function in the manner as was set out more clearly in connection with the description of Fig. 17. The belt in these figures (21, 22 and 23) bears reference character 68. As will be noted from these figures, the portion of the belt which lies adjacent the belt-on side of the pulley is embraced in the manner as hereinbefore set out by the belt guides or loops, 70 the follower being designed to extend across the cone pulley and to embrace the portion of the belt which lies adjacent the off-side of the pulley. As above stated, these followers have been found to be particularly effective in the shifting of belts which operate on steep cones and are designed primarily to prevent the belt from assuming a position such as shown in Fig. 20, in which position considerable difficulty would be encountered in shifting the belt without the aid of some means, such as the followers herein described, to engage the same on the off-side of the pulley and guide it in such wise as to enable the same to be guided easily and quickly upon the step of the pulley on which it is desired to shift the belt. In Fig. 23, the dotted line A—B shows substantially the path that the off-side of the belt passes through when the same assumes a position such as shown in Fig. 20, said path in the illustration being an arc struck from the point "X" as a center. As is well known, it is desirable in shifting a belt from one step of a pulley to another to guide the on-side of the belt onto said step slightly in advance of the off-side of the belt, as shown more clearly in Fig. 23, and in order to accomplish this result by the use of my improved shifter and follower, it is preferred to off-set the sides of the follower slightly outwardly from the sides of the belt embracing members, as shown more clearly at $69'$ and $69''$ in Fig. 23. In this manner the off-side of the belt is not engaged by the follower until the on-side thereof has been forced slightly over the step of the pulley onto which it is desired to shift the belt. In this manner, a belt may be shifted from one step to another on comparatively steep cones with rapidity and certainty. In Fig. 24, a further modified form of follower is illustrated, the same being shown in the form of a guiding member 70, having its outer end bent substantially as shown at 72 to prevent the belt from passing around the follower and thus out of the control of the shifting mechanism. The inner end of the guiding member 70 is fastened in any suitable manner to a diagonally disposed shank 71, which is carried by a suitable hub member similar to that shown in Fig. 21. The hub member in this form of follower is also adjustably mounted by means of a suitable set screw on the shifting rod 1.

In Figs. 25 to 28, inclusive, I have illustrated a foot-operated shifter designed primarily for use in connection with drill-presses, when the latter are used in operating upon small articles in great numbers.

For instance, in tapping a hole in a small sheet metal article the operation is a very short one and oftentimes requires a shifting of the belt during the operation. Considerable time is therefore lost in shifting the belt from one step of the pulleys to another which reduces materially the amount of work which the operator is able to turn out. The embodiment of the invention shown in these figures comprises a shifting rod 148, and operating arm 149, which is preferably of the waved-edge type, said arm passing loosely through the retaining strap 150 which is carried by a suitable bracket 159 secured to the column of the machine. The operating arm 149 is mounted on the pivot or supporting rod in the same manner as hereinbefore described in connection with the other figures of the drawings. At the lower end 152 of the bracket 151 is carried a suitable stub shaft on which is mounted a pulley wheel 153 having a plurality of cable grooves. Mounted on the base of the machine are a plurality of upstanding brackets 161 designed to carry a suitable axle 160 on which are rotatably mounted two pulleys 158 and 159, disposed around the hubs of which and spaced apart are a plurality of pedals. A cable 156 fastened to the operating arm 149 at 157 extends over one of the grooves in the pulley wheel 153 and thence downwardly to the pulley 159, to which latter pulley said cable is fastened at its other end. Attached to the opposite end of the operating arm 149 at 155 is another cable 154, which extends over the other groove in the pulley wheel 153 and from thence downwardly to the pulley 158, to which the lower end of said cable is attached. The pedals for operating the shifter shown in this embodiment of the invention preferably correspond in numbers to the number of steps on the cone pulleys. It will be noted from the foregoing that by pressing on one of the pedals carried by the pulley 158 that the operating arm 149 will be moved longitudinally to the right, as viewed in Fig. 45, to thereby shift the belt to the extreme end of the cone pulleys, as viewed in said figure, whereas, by operating the pedals carried by the pulley 159 the cable 156 will be moved downwardly, thereby drawing the shifter to the left, as viewed in Fig. 45, thus enabling the operator to shift the belt toward the other end of the cone pulleys. In other words, by alternately operating the pulleys 158 and 159, the shifter may be moved in the desired direction. As was pointed out in detail in connection with Fig. 13, the waved edges of the operating arm 149 serve to impart to the shifter the desired oscillatory motion. If desired, suitable retaining members, shown in the drawings in the form of resilient elements 162, may be arranged adjacent the pedals of the pulleys 158 and 159 to lock the shifter in its adjusted position.

The modification of the invention illustrated in Figs. 29 to 33, inclusive, has been designed more particularly for use in connection with machines designed for heavy work, such machines requiring, as is well known, large belts which must necessarily be very taut in order to transmit the desired driving speed to the spindle of the machine. With this in view, the shifter disclosed in this form of the invention is provided with positive belt guiding mechanism adjacent each cone pulley. Referring more in detail to these figures of the drawing, a conventional lathe cone mounted in the headstock of the machine is shown at 110, the countershaft cone at 111 supported on the usual shaft which is mounted in the hanger 112, to which hanger is secured by suitable fastening means 113' a depending bracket 113, and at the opposite end of the cone is located another bracket or hanger 114. Mounted between these brackets and rigidly supported thereby are a pair of guides 119 upwardly and inwardly inclined in substantially the same manner as the supporting or pivot rod is inclined in the other embodiments of the invention. Between these guides 119, a suitable rearwardly projecting element of the belt embracing member 115 is mounted, so that when said belt embracing member is moved longitudinally of the cone, the same will be guided in substantially the same manner as the belt embracing members hereinbefore described are guided. Attached to the lower ends of the brackets 113 and 114, adjacent the opposite ends of the guides 119, are pulleys 116. A construction similar to that just described is also mounted adjacent the lower cone pulley 110 of the machine, the two supporting standards or brackets being designated by reference characters 117 and 118, the guides 119 being mounted between the same in substantially the same manner as just described. The brackets 117 and 118 are also provided with pulleys wheels 120 positioned adjacent the opposite ends of the guides 119. The lower belt embracing member 121 is mounted in the same manner as the member 115, and is adapted to be guided in its movements longitudinally of the adjacent cone pulley by means of the guides 119. The bracket 118 is preferably extended upwardly a considerable distance above the guides 119, as shown at 123, the upper end of said bracket being adapted to receive and support the hand-wheel 122 and associated operating mechanism for the shifter. Secured adjacent the upper end of the standard 118 is a suitable bracket 127 in the end of which is journaled one end of the shaft 128, to which the hand operated wheel 122 is mounted. Mounted on the shaft 128 are two drums 125 and 126, the drum 126 being keyed to the shaft, while the drum 125 is loosely mounted thereon. The outer end of the shaft 128 is journaled in the hub of the wheel 122, as shown at 129, said hub being in turn journaled in the upper end of the standard 123, as shown more clearly in Fig. 30. Mounted on the shaft 128 intermediate the inner drum 125 and the hub of the wheel are a plurality of star wheels 139 and 140, the wheel 139 being keyed to the shaft 128, while the wheel 140 is mounted loosely thereon, but anchored by means of pins 141 to the inner end of the drum 125. Strapped to the upper end of the standard 123 in any suitable manner and surrounding the shaft 128 are a plurality of cam plates 136 and 137, each of said plates being provided with a cam groove 147. Mounted adjacent each of the star wheels 139 and 140, and pivotally attached to the hub of the wheel 122, are pawls 130 and 131, the pawl 130 being mounted adjacent the star wheel 139, while the pawl 131 is mounted adjacent the star wheel 140. Each of these pawls 130 and 131 are provided with pilots 135 designed to ride in the respective cam grooves of the members 136 and 137. Wire cables A' and B'' are secured to the drum 126 and extend therefrom over the pulleys 120, the lower ends of said cables being attached in any suitable manner to the belt embracing member 121. A similar arrangement is provided for the belt embracing member 115, to which the outer ends of the cables A'' and B' are attached, the opposite ends of said cables being passed over and attached to the drum 125. These pawls 130 and 131 are so disposed with respect to the star wheels 139 and 140 and the cam grooves 147, that upon each half rotation of the wheel 122, the pawl 130 will first engage its star wheel 139 and rotate the drum 126 a quarter of a revolution, after which the pawl 131 will engage its star wheel 140 and rotate the drum 126 a quarter of a revolution. Assuming therefore that the hand-wheel 122 is turned a half of a revolution in the direction of the arrow A, it will be noted that the belt embracing member 121 is first operated to move the belt off one step of the adjacent cone pulley onto the next, immediately after which the other belt embracing member 115 is operated to shift the belt onto the corresponding step of the pulley 111. The order in which the belt embracing members 115 and 121 are operated will be reversed it will be noted in the event that the hand-wheel is rotated in the direction of the arrow B. In this manner the same effect is secured as is secured in the other embodiments of the invention by imparting to the shifting rod an oscillatory motion. It is preferred to provide suitable notches around the edges of the inner ends of each of the drums 125 and 126, which notches may be engaged by suitable spring actuated plungers 144 and 146, respectively, to lock the drums at the end of each quarter of a revolution. As a further means of maintaining the shifter in any of its positions, there may also be provided a suitable retaining member, preferably in the form of a leaf-spring 147', designed to contact with the hand-wheel 122 to maintain the same in any position in which it may be set.

It is not desired to limit or restrict the invention except where limitations appear in the appended claims.

I claim—

1. The combination with a stepped pulley, of a driving belt therefor, a belt shifting device arranged to contact with said belt, and means for moving said device along a path which is oblique with respect to the plane of the belt and also with respect to a plane passing through the axis of rotation of the pulley and at right angles to the plane of the belt, whereby said device is maintained at substantially the same distance from the respective steps on said pulley for each position of the belt.

2. The combination with a plurality of cone pulleys and a power transmitting belt therefor, of means for embracing said belt at points adjacent said pulleys, means for moving said embracing means to shift said belt, and an upwardly and inwardly inclined support for guiding said embracing means.

3. In a belt shifter, the combination with a plurality of cone pulleys and a belt therefor, of an oscillatory shifter rod extending between said pulleys, belt-embracing members carried thereby, an operating arm for said rod, and means adapted to coact with said arm to lock said rod in its adjusted position and to prevent twisting thereof.

4. In a belt shifter, the combination with a plurality of cone pulleys and a belt therefor, of a shifter rod extending between said pulleys, belt-embracing members carried thereby, an operating arm for said rod, means whereby said arm may be moved to effect a shifting of said rod and said belt, and means for guiding said rod in such manner that said belt-embracing members will move in a plane substantially parallel to the plane of the high points of said pulleys.

5. In a belt shifter, the combination with a plurality of cone pulleys and a belt therefor, of a shifter rod, belt-embracing members at opposite ends thereof, an inclined pivot rod for said shifter rod, and means whereby said shifter rod may be rocked on said pivot rod and also moved longitudinally thereon to effect a shifting of said belt.

6. In a belt shifter, the combination with a plurality of cone pulleys and a belt therefor, of a shifter rod, belt-embracing members at opposite ends thereof, an upwardly inclined pivot rod for said shifter rod, an operating arm on said shifter rod whereby the same may be moved to effect a shifting of said belt, and means adapted to coact with said arm to maintain said shifter rod in its adjusted position and against lateral displacement.

7. In a belt shifter, the combination with cone pulleys and a belt therefor, of a shifter rod extending between said pulleys, the opposite ends of said rod lying adjacent and in close proximity to the on-sides of said pulleys, a loop at each end of said rod adapted to embrace said belt, means for moving said rod to shift said belt, and means for guiding said rod during such movement to effect a travel of each of said loops along a line substantially parallel to the nearest high point line of its corresponding pulley.

8. In a belt shifter, the combination with cone pulleys and a belt therefor, of an upwardly and inwardly inclined support, a shifter rod rotatably and slidably mounted thereon, and means for holding said shifter rod against lateral displacement, said rod being provided with belt-embracing means whereby said belt may be shifted on said pulleys when said rod is moved on its support.

9. In a belt shifter, the combination with cone pulleys and a belt therefor, of an inclined support mounted in fixed relation to said pulleys, a shifter rod slidably and rotatably mounted on said support, belt-embracing members carried at opposite ends of said rod, an operating arm rigidly secured to said rod and extending transversely with relation thereto, and a strap adapted to receive said arm and to coöperate therewith to lock said rod in its various positions of adjustment and to maintain it against lateral swinging.

10. In a belt shifter, the combination with a plurality of cone pulleys and a belt therefor, of an inclined support, a shifter rod rotatably and slidably mounted thereon, and a plurality of spaced apart belt-embracing loops carried by said rod near each end thereof.

11. In a belt shifter, the combination with a plurality of cone pulleys and a belt therefor of a shifter rod, belt loops at each end thereof adapted to engage and shift said belt when said rod is moved, an upwardly and inwardly inclined supporting rod, an operating arm for said shifter rod rigidly secured thereto and extending therefrom at substantially right angles, a lug on said arm having an aperture therein adapted to receive said supporting rod whereby said arm and said shifter rod may be moved longitudinally thereof, and means coöperating with said arm to prevent twisting thereof and to maintain said shifter rod in operative position.

12. In a belt shifter, the combination with a plurality of cone pulleys and a belt therefor, of a support, a shifter rod mounted thereon, a loop carried by said rod at each end thereof adapted to embrace said belt as the same passes on said pulleys, a follower adapted to embrace said belt as the same passes off one of said pulleys, the sides of said follower being offset outwardly from the sides of said loops whereby when said rod is moved to shift said belt the on-sides of said belt will be advanced prior to the off-sides thereof, and means for moving said rod.

13. In a belt shifter, the combination with a plurality of cone pulleys and a belt therefor, of an inclined support, a shifter rod rotatably and slidably mounted thereon, a plurality of spaced apart loops carried by said rod near opposite ends thereof adapted to embrace said belt as the same passes on said pulleys, followers adapted to embrace said belt as the same passes off said pulleys, and means to move said loops and followers longitudinally of said pulleys to shift said belt.

14. The combination with a stepped pulley, of a driving belt therefor, a belt-shifting device arranged to contact with said belt adjacent one side of said pulley, a follower arranged to embrace said belt adjacent the other side of said pulley, the sides of said follower being offset from the sides of said shifting device whereby when the latter is moved to shift said belt one lap of said belt will be advanced prior to the advancement of the other lap thereof, and means for moving said shifting device.

15. A belt shifter for cone pulleys comprising a shifting rod extending substantially the full distance between said pulleys and being mounted between the two laps of the belt, belt embracing members carried by said rod at opposite ends thereof, means for pivotally and slidably supporting said rod substantially centrally thereof, and means for actuating said rod on said support to shift said belt.

16. A belt shifter for cone pulleys comprising a shifting rod, means for actuating the same, belt embracing members carried by said rod at opposite ends thereof and adapted to engage the belt adjacent the on-sides of said pulleys when said rod is operated to shift said belt, and a plurality of followers movable with said rod and adapted to engage said belt adjacent the off-sides of said pulleys during the shifting operation.

17. A belt shifter for cone pulleys comprising a shifting rod, means for actuating the same, belt embracing members carried by said rod at opposite ends thereof and adapted to engage the belt adjacent the on-side of said pulleys when said rod is operated to shift said belt, and a plurality of followers movable with said rod and adapted to engage said belt adjacent the off-sides of said pulleys during the shifting operation, the sides of said followers being off-set slightly from the sides of said belt embracing members, whereby the on-portions of said belt will be shifted slightly in advance of the off-portions thereof.

18. A belt shifter for cone pulleys comprising a shifting rod extending substantially the full distance between said pulleys and being mounted between the two laps of the belt, belt embracing members carried by said rod at opposite ends thereof, means for pivotally and slidably supporting said rod substantially centrally thereof, means for actuating said rod on said support to shift said belt, and means for imparting an oscillatory motion to said rod during such actuation.

19. A belt shifting device for cone pulleys comprising a belt embracing member adapted to engage the belt adjacent the onside of one of said pulleys, means for moving said member from one end of said pulley to the other to shift said belt, and means for guiding said member during such movement in such wise that said member is maintained substantially the same distance from the respective steps on said pulley for each position of the belt.

20. A belt shifting device for cone pulleys comprising belt embracing members adapted to engage the belt adjacent the onsides of said pulleys, means for moving said members longitudinally of said pulleys to shift said belt, means for guiding said members during such movement in such wise that said members are maintained substantially the same distance from the respective steps of their respective pulleys for each position of the belt, and means whereby during each shifting operation one of said members is advanced in the direction of shifting prior to the other of said members.

NILS E. LARSON.

Witnesses:
W. HARDING,
H. CARLSON.

Copies of this patent may be obtained for five cents each, by addressing the "Commissioner of Patents, Washington, D. C."